United States Patent [11] 3,553,443

[72] Inventor Hugh G. Neil
P.O. Box 1950, Knoxville, Tenn. 37901
[21] Appl. No. 795,935
[22] Filed Feb. 3, 1969
[45] Patented Jan. 5, 1971

[54] HYBRID FUNCTION GENERATOR FOR OPTICAL SENSING SYSTEMS
22 Claims, 9 Drawing Figs.

[52] U.S. Cl. .......... 235/150.53, 235/197, 340/347
[51] Int. Cl. .......... G06g 7/26
[50] Field of Search .......... 235/150.5, 150.51, 150.52, 150.53, 150.3, 150.31, 150.4, 197; 340/347, O-A

[56] References Cited
UNITED STATES PATENTS

| | | | |
|---|---|---|---|
| 3,080,555 | 3/1963 | Vadus et al. | 235/150.53X |
| 3,146,343 | 8/1964 | Young | 235/150.52X |
| 3,183,342 | 5/1965 | Wortzman | 235/150.5X |
| 3,192,371 | 6/1965 | Brahm | 235/150.51X |
| 3,452,258 | 6/1969 | Thompson | 340/347X |

*Primary Examiner*—Eugene G. Botz
*Assistant Examiner*—Joseph F. Ruggiero
*Attorney*—Burns, Doane, Benedict, Swecker & Mathis

ABSTRACT: A hybrid digital-to-analogue function generator for generating analog voltages which are nonlinear functions of an input digital number. The function generator uses digital-to-analog converters which have two reference voltage inputs, $E_o$ greater than $E_i$, the output voltage of each converter being defined as:

$$V = D(E_o - E_i) + E_i.$$

A particular converter having these characteristics is disclosed. A variety of complex functions are generated using three basic techniques, either separately or in combination. The first technique is serial connection of any number of these D-A converters. The second contemplates varying one of the reference voltage inputs as, for example, by feeding back a percentage of the output of the D-A converter. The third technique describes the effect of varying the other reference voltage input by feeding back a percentage of the output of the D-A converter. An example of combining two of these techniques to approximate an inverse exponential is described and illustrated in an optical fiber sensing system.

INVENTOR
HUGH G. NEIL
BY Burns, Doane, Benedict, Irecker and Mathis
ATTORNEYS

HYBRID FUNCTION GENERATOR FOR OPTICAL SENSING SYSTEMS

BACKGROUND OF THE INVENTION

The present invention relates to function generators. More specifically, the invention relates to hybrid digital-to-analogue (D-A) function generators for generating complex algebraic functions.

The development of digital logic techniques has led to a variety of applications of such techniques. Digital computation and control techniques are not limited to data-processing systems per se. Such techniques have been expanded to include a broad variety of process control applications including measurement, computation and control of industrial processes.

The field of quality control has been particularly affected by new digital techniques when important advances have been made in the sampling and testing of both raw material and finished products. A major problem in such applications, however, has been the development of interface equipment which converts the characteristics of the thing being measured to a digital number which can then be utilized by the digital logic. Measuring instruments such as probes, sensors, etc. are generally analogue rather than digital, devices. Before the output of such measuring instruments can be utilized by a digital logic system their outputs must be converted from an analogue voltage to a digital number.

The conversion of an analogue voltage to a digital number is accomplished by a system referred to broadly as an analogue-to-digital (A-D) converter. Such a converter generally compares the input analogue voltage with a second analogue voltage which is proportional to the digital number generated and then changes the digital number until the comparison indicates that the requisite conversion has been accomplished. Such systems present few problems if the relationship between the input analogue voltage and the digital number is to be linear. However, where a nonlinear relationship is required, it is necessary to provide a function generator which conforms to the nonlinear relationship.

Hybrid function generators of the prior art have not been completely satisfactory for a number of reasons. One of these drawbacks is related to the inflexibility of prior art approaches. While a particular circuit might be well adapted to the generation of a particular function, it could not readily be modified to generate other functions.

It is known, for example, to utilize conventional digital-to-analogue (D-A) converters for function generation. A limited range of functions can be generated by serially connecting D-A converters thereby generating squared functions, cubic function, etc. However, this approach has not heretofore been susceptible to generation of more complex functions requiring additional terms, constants, etc. The limitations on these prior art systems result primarily from the fact that the D-A converters used utilized a single fixed reference voltage which placed significant limits on the range of functions possible.

SUMMARY OF THE INVENTION

It is an object of the present invention to provide novel ways of generating nonlinear algebraic functions.

It is a further object to provide a novel hybrid D-A function generator which is simple and extremely flexible, and capable of generating a variety of such functions with minor adjustments and/or modifications.

It is a further object of the present invention to provide a number of novel techniques for nonlinear function generation which can be used either separately or combined to approximate complex, nonlinear functions.

It is a further object to provide a novel system for generating a digital number which is a nonlinear function of the output of a radiation detector such as a photocell.

Briefly, the present invention provides for complex function generation utilizing D-A converters with two reference voltage inputs. A variety of functions are generated by varying one or both of these reference voltages including feeding back a portion of the analogue output voltage to vary these references voltages. The D-A converters may be connected in series to provide still further flexibility.

BRIEF DESCRIPTION OF THE DRAWINGS

The present invention will be better understood by referring to the embodiments disclosed in the specifications and accompanying drawings in which.

DESCRIPTION OF PREFERRED EMBODIMENTS

Figure 1:
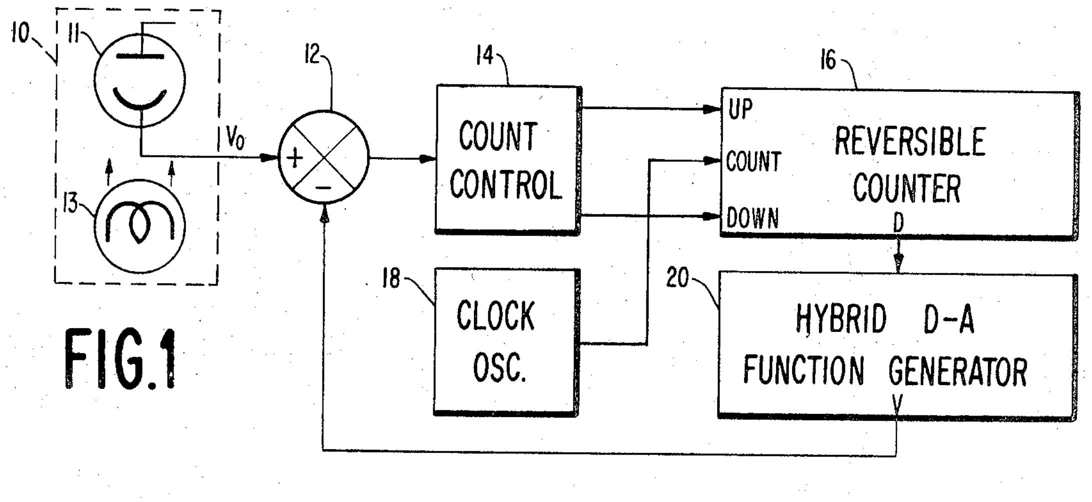
FIG. 1 is a block diagram of a nonlinear analogue-to-digital conversion system which utilizes a hybrid D-A function generator of the type embodying the present invention.

FIG. 1 shows a system for converting the analogue voltage output, $V_o$, of a sensor 10 to a digital number, the relationship between the analogue voltage output and the digital number being some nonlinear complex function.

The sensor 10 may comprise, for example, a radiation detector such as photocell 11. In a system of this type, the photocell 11 may be used to detect the amount of light passing through or reflected from a sample irradiated by a light source 13. The output of the photocell 11 may therefore indicate some characteristic of the sample such as thickness, transparency, color, etc. with the relationship between the output of the photocell 11 and the desired characteristic being some nonlinear function. This technique is applicable, for example, to measurement of the span length of staple fibers such as cotton as explained in detail in copending application Ser. No. 795,521 of the present inventor, filed Jan. 31, 1969.

The analogue voltage output of the sensor 10 forms one input to a comparator 12. The comparator output is relayed to a count control circuit 14 which controls the direction in which a reversible counter 16 will count.

The count control circuit 14 may comprise, for example, a bistable device such as a Schmitt trigger which assumes one state when its input voltage is positive and the opposite state when the input voltage is negative. Pulses are fed from a clock oscillator 18 to the reversible counter 16 so as to cause it to count one bit in the commanded direction for each input pulse. The digital number D in reversible counter 16 forms the input to a hybrid digital-to-analogue function generator 20.

Briefly, hybrid D-A function generator 20 generates an output analogue voltage which is a nonlinear function of the input digital number. The voltage output, V, of hybrid D-A generator 20 forms the second input to comparator 12.

The system of FIG. 1 converts the analogue voltage output $V_o$ of the sensor 10 to a nonlinear digital number. The output of the sensor 10 is compared with the output of the hybrid D-A generator 20 by comparator 12. If these output voltages are unequal, the count control circuit 14 will assume the state necessary to command reversible counter 16 to count in the direction necessary to equalize these two input voltages. A system of this type is sometimes referred to as an analogue-to-digital converter of the continuous type. A linear system of this type is shown, for example, at pages 263—264 of The Digital Logic Handbook (Digital Equipment Corporation, Maynard, Mass. 1966).

Figure 2:
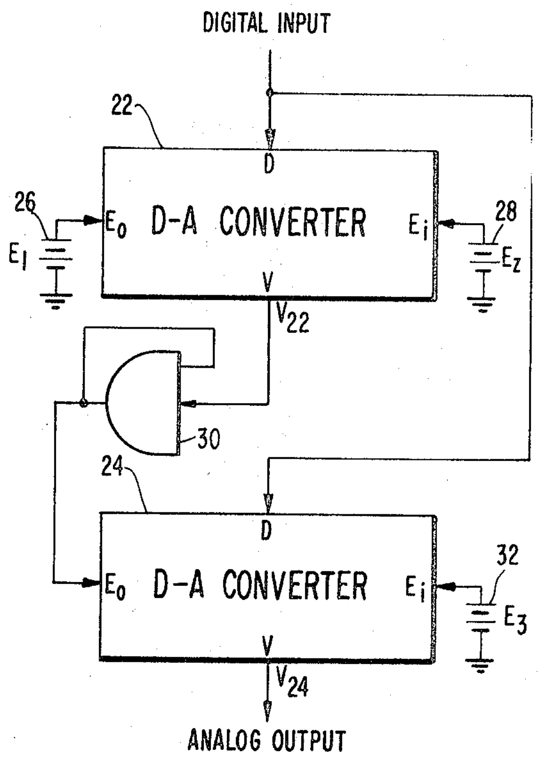
FIG. 2 is a diagram of an embodiment of a hybrid D-A function generator capable of use in a system such as shown in FIG. 1.

FIG. 2 reveals a first embodiment of a hybrid digital-to-analogue function generator illustrating the effect of serially connecting two D-A converters in accordance with the present invention. The function generator of FIG. 2 includes two D-A converters 22, 24. The converters 22, 24 have three input terminals labeled D, $E_o$, and $E_i$ and a single output terminal V. The D input terminal accepts the digital number to be converted to an analogue voltage which then appears on the V output terminal. The $E_o$ input terminal is the high reference voltage input and the $E_i$ input terminal is the low reference input terminal. The analogue voltage output V of such a converter is determined by the following relationship:

$$V=D(E_o-E_i)+E_i$$

For simplicity, all variables in this and succeeding relationships are normalized, i.e. restricted to the range from zero to one. One embodiment of a D-A converter having these characteristics is shown in detail in FIG. 7.

The D input terminals of converters 22, 24 are connected to the source (such as the reversible counter 16 of FIG. 1) of the digital number to be converted to a nonlinear analogue voltage. The $E_o$ input terminal of converter 22 is connected to a first voltage source 26 (labeled $E_1$ while the $E_i$ input terminal of converter 22 is connected to a second voltage source 28 (labeled $E_2$). The output voltage from converter 22 forms the input to a unity gain amplifier 30 which serves to isolate the two converters 22, 24 and prevent inaccuracies due to loading.

The output of the amplifier 30 is fed to the $E_o$ input terminal of converter 24. A third voltage source 32 (labeled $E_3$) is connected to the $E_i$ input terminal of converter 24. Certain limitations must be placed on the system as shown in that the voltage $E_3$ must be less than the voltage $E_2$ which must be less than the voltage $E_1$.

The function generator of FIG. 2 generates a quadratic equation of the general form, $V=aD^2+bD+c$ as follows:

(1) By definition, the output of converter 22 is:

$$V_{22}=D(E_1-E_2)+E_2$$

where:

$E_1$=reference voltage 26
$E_2$=reference voltage 28

(2) Similarly, the output of converter 24 is:

$$V_{24}=D(V_{22}-E_3)+E_3$$

where:

$E_3$=reference voltage 32

(3) Substituting (1) into (2):

$$V_{24}=D([D(E_1-E_2)+E_2]-E_3)+E_3$$
$$V_{24}=(E_1-E_2)D^2+(E_2-E_3)D+E_3$$

Thus, the function generator of FIGURE 2 yields the quadratic equation defining a parabola:

$$V=aD^2+bD+c$$

where:

$a=E_1-E_2$
$b=E_2-E_3$
$c=E_3$

By appropriate choice of $E_1$, $E_2$, $E_3$, the particular parabolic relationship desired may be readily generated.

Figure 3:
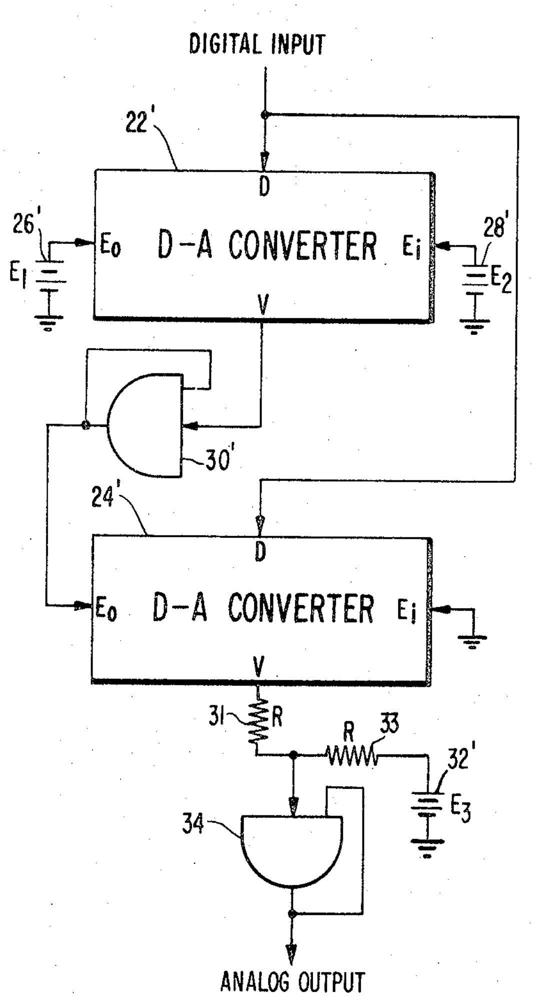
FIG. 3 is a diagram of an additional embodiment which is a modification of the embodiment of FIG. 2.

FIG. 3 is an alternative embodiment for generating the same parabolic relationship. The embodiment of FIG. 3 is quite similar to that of FIG. 2, the identical elements bearing the same numbers (with primes) as those used in FIG. 2.

In FIG. 3, the third reference voltage $E_3$ is removed from the $E_i$ input of converter 24', the input $E_i$ being now connected to ground.

With this modification, the output of converter 24' is:

$$V=aD^2+bD$$

where:

$a=E_1-E_2$
$b=E_2$

The output of converter 24' is fed via resistor 31 to amplifier 34. A third reference voltage 32' ($E_3$) is also fed to amplifier 34 via resistor 33. Resistors 31, 33 are equal in value so that the output of amplifier 34 is the sum of these input voltages and equals:

$$V=aD^2+bD+c$$

where:

$a=E_1-E_2$
$b=E_2$
$c=E_3$

The embodiment of FIG. 3 has certain distinct advantages over that shown in FIG. 2. First, the three constants *a*, *b*, *c* are essentially independent of each other so that the full range of quadratics of the general form described can be generated. In addition, since $E_3$ is no longer connected to the low reference voltage input $E_i$ of converter 24', $E_3$ need not be less than $E_2$ as is required in the embodiment of FIG. 2. Finally, the constant factor *c* can now be either the same or opposite sign from *a* and *b* by appropriate selection of the polarity of the third reference voltage source 32'.

It will also be evident that additional flexibility can be obtained by removing the second reference voltage source ($E_2$) 28' from the low reference voltage input $E_i$ of converter 22', connecting the low reference voltage input $E_i$ to ground and adding $E_3$ to the second input of a summing amplifier substituted for amplifier 30'.

Figures 3A, 6A:
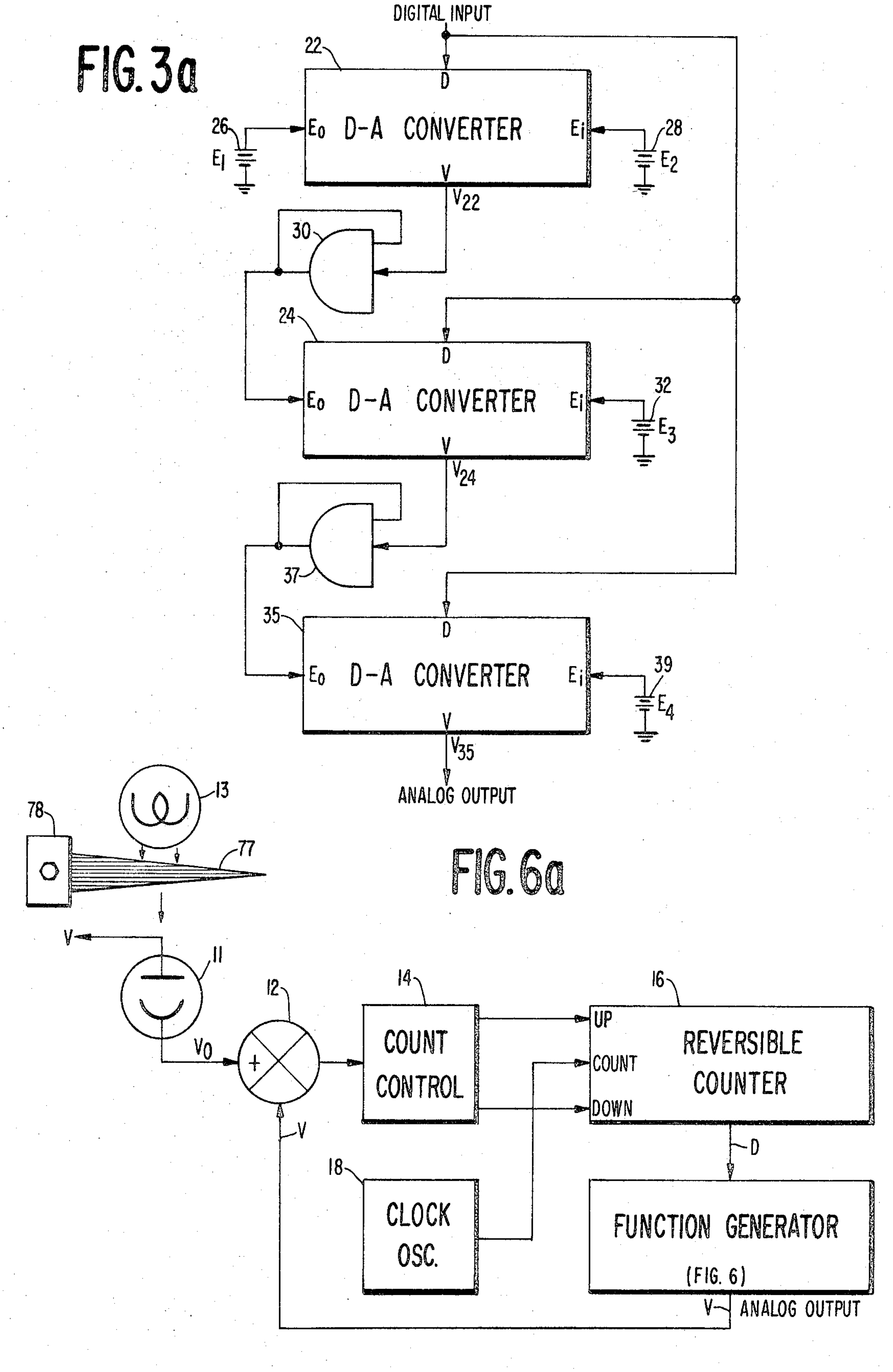
FIG. 3*a* is a diagram of an additional embodiment which is another modification of the embodiment of FIG. 1.
FIG. 6*a* is a diagram of a fiber measurement system utilizing the function generator of FIG. 6 in a system of the type shown in FIG. 1.

FIG. 3*a* illustrates the use of serially connecting D-A converters (as in FIGS. 2 and 3) to generate a higher order quadratic, i.e. a cubic. The function generator of FIG. 3*a* is identical to that of FIG. 2 with the addition of a third D-A converter 35 which has its high-reference voltage input $E_o$ connected to the analogue voltage output of D-A converter 24 via isolating amplifier 37. The low-reference voltage input $E_i$ is connected to a fourth reference voltage source 39.

The output of *D-A* converter 35 is:

(1) $$V_{35}=D(V_{24}-E_4)+E_4$$

where:

$V_{24}$=analog voltage output of *D-A* converter 24
$E_4$=reference voltage 39

From the discussion of Figure 2, it will be recalled that $$V_{24}=(E_1-E_2)D^2+(E_2-E_3)D+E_3$$

Substituting this relationship into (1) above:

(2) $$V_{35}=D[(E_1-E_2)D^2+(E_2-E_3)D+(E_3-E_4)]+E_4$$
$$\therefore V_{35}=(E_1-E_2)D^3+(E_2-E_3)D^2+(E_3-E_4)D+E_4$$

This conforms to the general equation of a cubic function:

$$V=aD^3+bD^2+cD+d$$

where:

$a=E_1-E_2$
$b=E_2-E_3$
$c=E_3-E_4$
$d=E_4$

If more flexibility in the choice of constants is required, the technique of FIG. 3 can be incorporated into the embodiment of FIG. 3*a*.

Figures 4, 5:
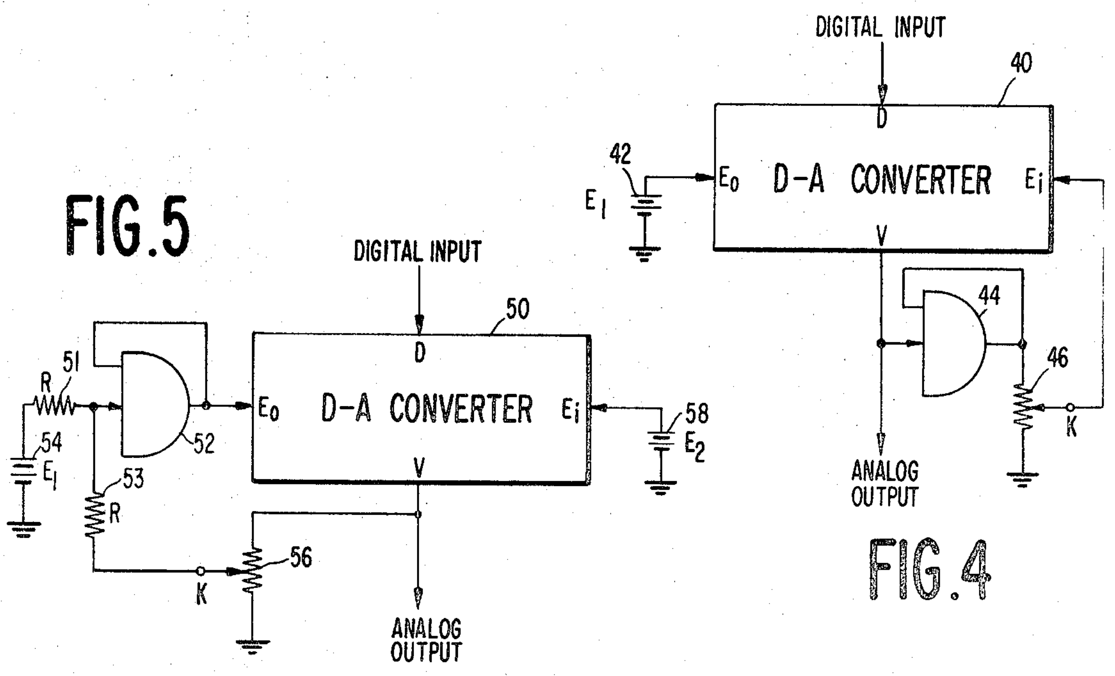
FIG. 4 is a diagram of an additional embodiment illustrating the effect of varying one of the reference voltage inputs.
FIG. 5 is a diagram of an additional embodiment illustrating the effect of varying the other reference voltage input.

The embodiment of FIG. 4 illustrates the effect of varying the voltage at the low reference voltage input $E_i$. In this particular embodiment, the reference voltage is varied by feeding a percentage of the output back to the low-reference voltage input.

A single D-A converter 40 is provided with its high reference voltage input $E_o$ connected to a reference voltage source 42. The output V is fed through an isolating amplifier 44 to a voltage divider 46. The output of the voltage divider 46 forms the low-reference voltage input $E_i$ so that the low reference voltage is a predetermined percentage of the output voltage. Thus, in the embodiment of FIG. 4, the voltage at the low reference voltage input $E_i$ is variable as opposed to the constant voltages used in FIGS. 2 and 3.

A function generator of this type generates an algebraic equation of the form, $$V=\frac{aD}{b+cD}$$

in the following fashion:

(1) The output of converter 40 is:

$$V=D(E_1-E_i)+E_i$$

where:

$E_1$=reference voltage 42

$E_i$=voltage at low reference voltage input (2) The low reference voltage input, $E_i$, is:

$$E_i=KV$$

where:

$K$=normalized setting of voltage divider 46

$V$=analog voltage output (3) Substituting (2) into (1):

$$V=D(E_1-KV)+KV$$

$$V=DE_1-DKV+KV$$

$$V+DKV-KV=DE_1$$

$$V(1-K+DK)=DE_1$$

$$V=\frac{DE_1}{(1-K)+DK}$$

which is of the general form:

$$V=\frac{aD}{b+cD}$$

where:

$$a=E_1$$

$$b=1-K$$

$$c=K$$

A still further approach to generation of complex algebraic functions is shown in FIG. 5. In this embodiment, the effect of varying the high-reference voltage input $E_o$ is illustrated. The function generator of FIG. 5 comprises a single D-A converter 50 which has its high-reference voltage input $E_o$ connected to the output of amplifier 52. The amplifier 52 has a first reference voltage source 54 connected to its input via resistor 51. The output of a voltage divider 56 connected to the analogue voltage output $V_1$ of D-A converter 50 is also fed to the input of amplifier 52 via resistor 53. The low-reference voltage input $E_i$ is connected to a second reference voltage source 58.

The function generator of FIG. 5 generates a function of the form, $$V=\frac{aD+b}{1-cD}$$

in the following fashion:

(1) The analog voltage output of converter 50 is:

$$V=D(E_o-E_2)+E_2$$

where:

$E_o$=voltage on the high reference voltage input $E_o$ $E_2$=reference voltage 58

(2) The high reference voltage input $E_o$ is:

$$E_o=E_1+KV$$

where:

$E_1$=reference voltage 54

$K$=normalized setting of voltage divider 56

(3) Substituting (2) into (1):

$$V=D(E_1+KV-E_2)+E_2$$

$$V-DKV=(E_1-E_2)D+E_2$$

$$V=\frac{(E_1-E_2)D+E_2}{1-KD}$$

which is of the general form:

$$V=\frac{aD+b}{1-cD}$$

where:

$$a=E_1-E_2$$

$$b=E_2$$

$$c=K$$

The function generation techniques as described thus far with respect to FIGS. 2—5 lend themselves to generation of specific families of curves defined by the relationships set forth. If the desired function fits one of the specific relationships outlined heretofore it is only necessary to choose the appropriate constants in order to yield the specific function desired.

There are, of course, applications for such function generators where none of the relationships set forth above apply. In these applications, the function generation techniques described above may still have application. One way to apply these techniques to generate other complex functions is to utilize one or more of the techniques described to approximate the function desired. Such approximations are particularly convenient where only a limited range of the input variable D is possible. By way of example, the parabolic function generated by the embodiments of FIGS. 2 and 3 might be used to approximate an exponential function of the form $e^{KD}$ for positive values of D. Thus, if the particular application requires an exponential function where the input variable is limited to a relatively small range of positive variables, the function generators of FIGS. 2 or 3 might well suffice to approximate the desired exponential. Selection of the appropriate embodiment (as well as the constants to be used) can be made by standard curve-fitting techniques which are well suited for computerized selection.

Where no single function described hereinbefore is appropriate, (either identically or by approximation) it is also possible to combine two or more of these techniques in order to generate the function desired. The choice of the appropriate combination, constants, etc. is also well suited to computerized selection given the function desired. While the description herein is limited to continuous functions, it will be evident that these techniques are equally suited to the approximation of noncontinuous functions.

Figure 6:
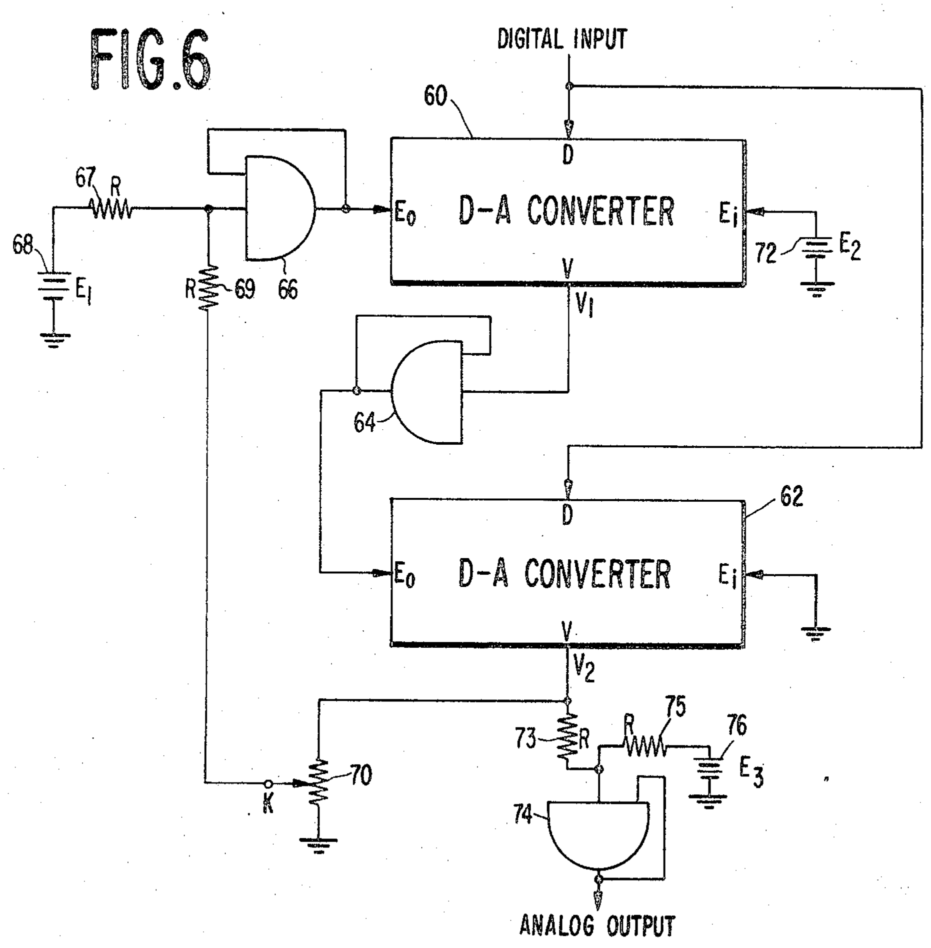
FIG. 6 is a diagram of an additional embodiment illustrating the approximation of a complex function by combining the techniques of FIGS. 3 and 5.

One example of combining these techniques is shown in FIG. 6. The function generator of FIG. 6 combines the techniques of FIGS. 3 and 5 to approximate an inverse exponential of the general form, $V=e^{-KD}$. Such a function expresses the relationship between the output of a photocell and the optical absorption of a semitranslucent sample interposed between a light source and the photocell.

The function generator of FIG. 6 includes two D-A converters 60, 62 connected in series via an isolation amplifier 64 which feeds the output of the first converter 60 to the high-reference voltage input $E_o$ of the second converter 62. As in FIGS. 2 and 3, the digital input is connected to the digital input D of both converters 60, 62. The high-reference voltage input $E_o$ of converter 60 is connected to the output of amplifier 66. A first reference voltage source ($E_1$) 68 is connected to the input of amplifier 66 via resistor 67. The other input to amplifier 66 is the output of a voltage divider 70 which is connected to the analogue voltage output V of the second converter 62 and fed to amplifier 66 via resistor 69.

The low-reference voltage input $E_l$ of the first converter 60 is connected to a second reference voltage source ($E_2$) 72. The low-reference voltage input $E_l$ of the second converter 62 is connected to ground. The output of converter 62 forms one input to a second summing amplifier 74. The other input to summing amplifier 74 is connected to a third reference voltage source ($E_3$) 76. The output of the summing amplifier 74 is the output of the function generator.

The function generator of FIG. 5 approximates an inverse exponential of the form, $V=e^{-KD}$, in the following fashion:

(1) The output $V_1$ of the first converter 60 is:

$$V_1=D(E_o-E_2)+E_2$$

where:

$E_o$=voltage at the high reference voltage input $E_o$ of converter 60

$E_2$=low reference voltage 72

(2) The output $V_2$ of the second converter 62 is:

$$V_2=DV_1$$

(3) The high reference voltage input $E_o$ on converter 60 is:

$$E_o=KV_2+E_1$$

where:

$K$=normalized setting of voltage divider 70

$E_1$=reference voltage source 68

(4) Substituting (3) into (1):

$$V_1=D(KV_2+E_1-E_2)+E_2$$

(5) Substituting (4) into (2):

$$V_2=D^2(KV_2+E_1-E_2)+DE_2$$

$$V_2-KD^2V_2=(E_1-E_2)D^2+E_2D$$

$$V_2=\frac{(E_1-E_2)D^2+E_2D}{1-KD^2}$$

(6) The output of summing amplifier 74 is:

$$V=V_2+E_3$$

where: $E_3$=reference voltage source 76.

(7) Substituting (5) into (6):

$$V=\frac{(E_1-E_2)D^2+E_2D}{1-KD^2}+E^3$$

The function described above approximates the inverse exponential, $V = e^{-2.6\,D}$, by making $E_1 = 0.55$, $E_2 = 0.15$, $E_3 = .075$, and $K = 0.45$. This inverse exponential expresses the relationship between the number of fibers in a cotton fiber beard sample and the analogue voltage output of a photocell when the fiber sample is placed between the photocell and an appropriate light source, as shown in FIG. *6a*.

FIG. *6a* illustrates the use of the function generator of FIG. 6 in a specific system of the general type shown in FIG. 1. The system of FIG. *6a* measures the number of fibers in a cotton fiber beard 77 inserted in the optical path between the light source 13 and the photocell 11. This system forms a part of a fiber measurement device for indicating the span length of staple fiber samples as explained in detail in copending application Ser. No. 795,521 of the present inventor, filed Jan. 31, 1969.

Briefly, the fiber sample 77 is held in an appropriate sample holder 78. At any given point along the fiber sample, the output of the photocell 11 is a function of the number of fibers at that point in the sample. This output is an inverse exponential of the number of fibers so that use of the function generator of FIG. 6 is the system of FIG. 1 results in the generation by reversible counter 16 of a digital number directly proportional to the number of fibers.

Figure 7:
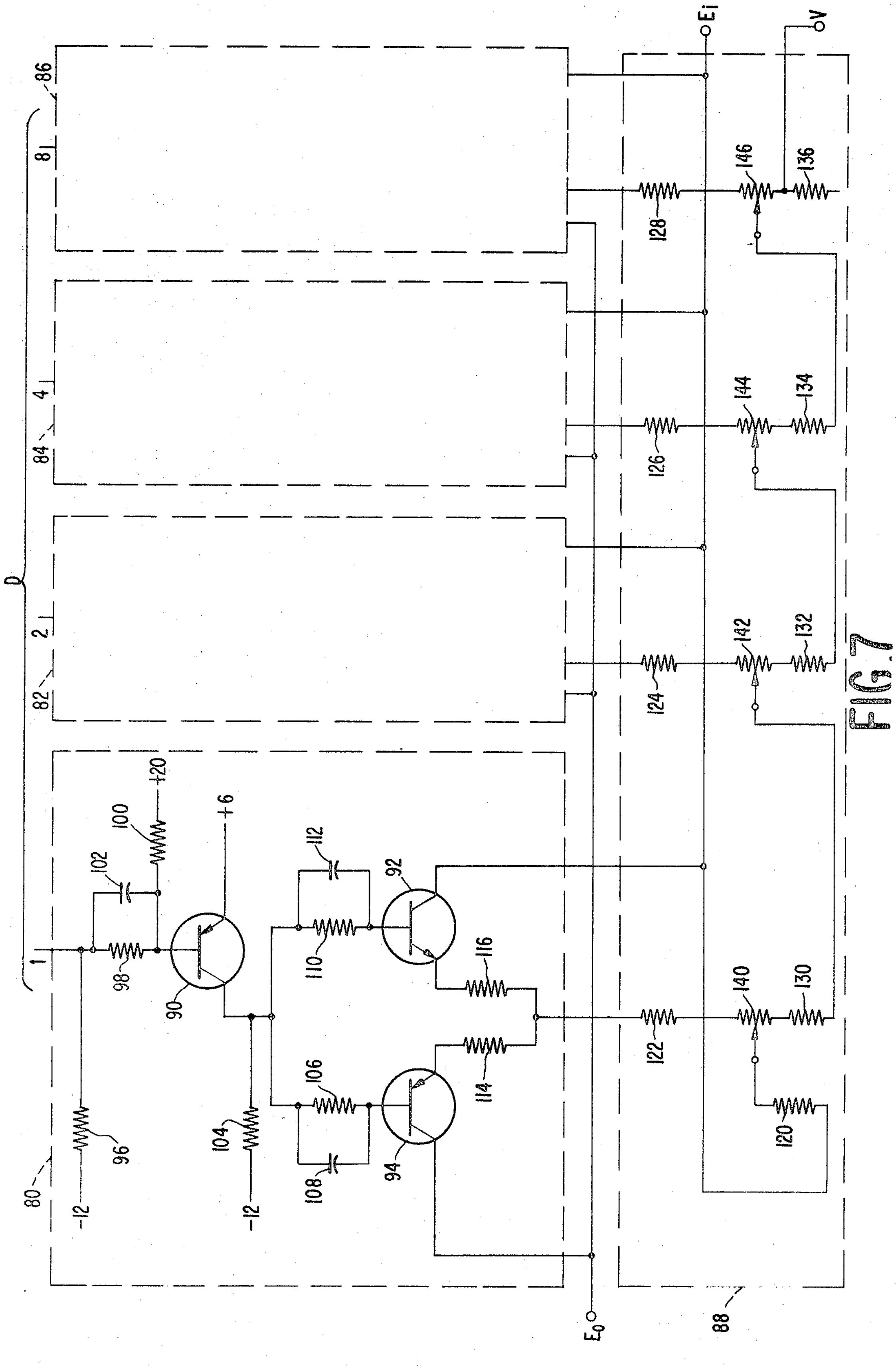
FIG. 7 is a schematic diagram of a preferred embodiment of a D-A converter capable of being used in the embodiments shown in FIGS. 2—6.

FIG. 7 illustrates a preferred embodiment of a digital-to-analog converter which permits the use of two reference voltages as is required in order to generate the complex algebraic functions set forth hereinbefore. As explained above, a D-A converter of this type generates an analogue voltage defined by $V = D(E_o - E_l) + E_l$. The D-A converter of FIG. 7 generates this function using a ladder network which switches between the two reference voltages, $E_o$ and $E_l$. Other types of converters, such as current summation converters, could also be used if appropriately modified.

The D-A converter of FIG. 7 illustrates the conversion of a four-bit binary number. As will be pointed out hereinafter, appropriate interconnection of a number of converters of the type shown in FIG. 7 will allow the conversion of a digital number having any number of binary bits.

Briefly, the converter of FIG. 7 comprises a plurality of transistor switches 80, 82, 84 and 86, each switch associated with a particular binary bit. The switches 80, 82, 84 and 86 operate to switch the high- and low-reference voltages into a ladder network of resistances shown generally at 88. The transistor switches 80, 82, 84 and 86 switch the high-reference voltage into the ladder network 88 whenever their associated bit is a logic 1 (0 V.). When the bit associated with a particular switch is a logic 0 (−12 V.), the low reference voltage is switched into the ladder network 88.

The transistor switches 80, 82, 84 and 86 are identical. Therefore, the transistor switch 80 is shown in detail and will be explained with the understanding that the operation of the remaining switches 82, 84, and 86 is identical.

The transistor switch 80 includes a first PNP transistor 90 which controls the conduction of a second PNP transistor 94 and an NPN transistor 92. Briefly, if PNP transistor 90 is conducting, then NPN transistor 92 will also be conducting. When NPN transistor 92 conducts, the low-reference voltage $E_l$ is switched into the ladder network 88.

Conversely, if PNP transistor 90 is not conducting then PNP transistor 94 will conduct. When PNP transistor 94 is conducting, the high-reference voltage $E_o$ is switched into the ladder network 88.

The conduction of the PNP transistor 90 is controlled as follows. The base circuit of PNP transistor 90 includes a first biasing resistor 96 connected to a negative voltage supply such as −12 V. and a second biasing resistor 100 connected to a positive voltage supply such as +20 V. In addition, there is provided a base input resistor 98 and a speed-up capacitor 102. When the 1-bit of the digital input is a logic 0 (− 12 V.) the base of PNP transistor 90 will be sufficiently negative to switch PNP transistor 90 into the fully conductive state. Conversely, if the 1 bit is a logic 1 (0 V.) then the base of PNP transistor 90 is pulled up through biasing resistor 100 to a sufficiently positive voltage to inhibit the conduction of PNP transistor 90. If PNP transistor 90 is conducting then the collector voltage will be approximately the same as the emitter voltage (+6 v.). On the other hand, if PNP transistor 90 is not conducting the collector is pulled down to a negative voltage through a pulldown resistor 104 connected to a negative voltage source such as −12 v. The collector voltage of PNP transistor 90 controls the conduction of transistors 92, 94. The base of PNP transistor 94 is connected via an input current-limiting resistor 106 and speed-up capacitor 108 to the collector of PNP transistor 90.

The collector voltage is negative when PNP transistor 90 is not conducting. This negative voltage serves to turn PNP transistor 94 fully on. Thus, when PNP transistor 90 is not conducting, PNP transistor 94 is conducting. Similarly, the base of NPN transistor 92 is connected to the collector of PNP transistor 90 through an input current-limiting resistor 110 and a speed-up capacitor 112. If PNP transistor 90 is conducting, the positive voltage on the collector turns NPN transistor 92 on so that NPN transistor 92 conducts when PNP transistor 90 conducts. Therefore, the conduction of transistors 92, 94 in the present transistor switch is mutually exclusive such that when one is conducting the other cannot conduct.

Since the low-reference voltage is connected to the collector of NPN transistor 92, it is clear that when the 1-bit is a logic 0 the transistor switch 80 operates to connect the low-reference voltage $E_i$ via output resistor 116 to the ladder network 88. Similarly, since the high-reference voltage is connected to the collector of PNP transistor 94, it is clear that when the 1-bit is a logic 1, transistor switch 80 operates to switch the high-reference voltage $E_o$ via output resistor 114 into the ladder network 88.

The transistor switches 80, 82, 84, 86 may be constructed with the components shown having the following exemplary values:

Transistor 90=2N404.
Transistor 92=2N1306.
Transistor 94=2N1305.
Resistor 96=1k ohms.
Resistor 98=10k ohms.
Resistor 100=15k ohms.
Capacitors 102, 108, 112=150 microfarads.
Resistors 104, 106, 110=3k ohms.
Resistors 114, 116=100 ohms.

The ladder network 88 of FIG. 7 decodes the conditions of the transistor switches 80, 82, 84 and 86 and generates an analogue voltage which is indicative of the states of these transistor switches.

The ladder network 88 includes a plurality of input resistors 122, 124, 126 and 128 having resistance R connected to each of the transistor switches. A terminating resistor 120 having resistance R is also provided and is connected to the low-reference voltage $E_i$. The states of the ladder network 88 are interconnected by coupling resistors 130, 132, 134, and 136 having resistance R/2.

Between each input resistor and its associated coupling resistor there is also provided a trimming potentiometer such as the potentiometers 140, 142, 144 and 146. The trimming potentiometers 140, 142, 144, 146 have a relatively low resistance compared to the resistance of the input and coupling resistors and are adjusted to provide the requisite ratio between the input and coupling resistors. Adjustment of the trimming potentiometers 140, 142, 144 and 146 also compensate for the effects of loading.

In one application of the ladder network 88, the following exemplary values were used:

Resistors 120, 122, 124, 126, 128=3k ohms.
Resistors 130, 132, 134, 136=1.5k ohms.
Potentiometers 140, 142, 144, 146=200 ohms.

Ladder networks of this type are well known and their operation is explained in detail in Notes on Analogue-Digital Conversion Techniques, Staff of the Servomechanisms Laboratory, Massachusetts Institute of Technology (Ed. by A. Susskind, Technology Press, 1957) at pages 5—29 to 5—35. The ladder network 88 is of the type referred to in the above publication as ladder network III shown in FIGS. 5—21 and explained in detail at page 5—35, modified by replacing the ground connection with a low-reference voltage input.

The D-A converter of FIG. 7 illustrates the conversion of a four-bit binary number D to an analogue voltage V which appears at the junction of resistors 136 and 146. A binary number having more than four bits can be decoded by providing a plurality of such converters appropriately interconnected. To interconnect the converters, it is only necessary to break the connection between terminating resistor 120 and trimming potentiometer 140 on all converters except the one associated with the least significant bits. This connection is replaced by connecting the output of coupling resistor 136 from each converter to the trimming potentiometer 140 of the next converter. The output voltage is then taken at the junction of resistors 136 and 146 in the last converter (i.e., the one associated with the most significant bits).

The present invention has been described with respect to particular embodiments thereof, variations and modifications of these embodiments will suggest themselves to persons skilled in the art. Therefore, the foregoing embodiments are intended to be exemplary only and the scope of the invention is to be ascertained from the following claims.

I claim:

1. A hybrid digital-to-analog function generator for generating an analogue voltage which is a nonlinear function of an input digital signal comprising:

a. first and second digital-to-analog converters each having a digital input D for receiving an input digital signal, a high-reference voltage input $E_o$ for receiving an analogue voltage, a low-reference voltage input $E_i$ for receiving an analogue voltage, and an analogue voltage output V, where $V=D(E_o-E_i)+E_i$;

b. a first voltage source operatively connected to said high-reference voltage input of said first digital-to-analog converter;

c. a second voltage source operatively connected to said low-reference voltage input of said first digital-to-analog converter;

d. means for connecting said analogue voltage output of said first digital-to-analog converter to said high-reference voltage input of said second digital-to-analog converter; and e. means for connecting the digital input signal to the digital input of said first and second digital-to-analog converter, the output of said second digital-to-analog converter being the analogue voltage output of said function generator.

2. The function generator recited in claim 1 wherein said means for connecting the output of said first digital-to-analog converter to the high-reference voltage input of said second digital-to-analog converter comprises an amplifier.

3. The function generator recited in claim 1 further comprising a third voltage source operatively connected to said low-reference voltage input of said second digital-to-analog converter.

4. The function generator recited in claim 1 further comprising:

a. voltage-summing means having first and second inputs, said first input being operatively connected to the output of said second digital-to-analog converter; and b. a third reference voltage source operatively connected to said second input of said voltage summing means the output of said voltage-summing means being the analogue voltage output of the function generator.

5. The function generator recited in claim 1 wherein said first and second voltage sources comprise constant voltage sources.

6. The function generator recited in claim 3 wherein said first voltage source is a variable voltage source.

7. The function generator recited in claim 6 wherein said variable voltage source comprises voltage-summing means having a first fixed voltage as a first input and a percentage of the output voltage from said function generator as a second input.

8. A hybrid digital-to-analog function generator for generating an analogue voltage which is a nonlinear function of an input digital signal comprising:

a. a digital-to-analog converter having a digital input D for receiving an input digital signal, a high-reference voltage input $E_o$ for receiving an analogue voltage, a low-reference voltage input $E_i$ for receiving an analogue voltage, and an analogue voltage output V, where $V=D(E_o-E_i)+E_i$;

b. a first, fixed voltage source operatively connected to said high-reference voltage input;

c. a second variable voltage source connected to said low-reference voltage input; and d. means for connecting the input digital signal to said digital input.

9. The function generator recited in claim 8 wherein said variable voltage source comprises a voltage divider operatively connected to said analogue voltage output.

10. A hybrid digital-to-analog function generator for generating an analogue voltage which is a nonlinear function of an input digital signal comprising:

a. a digital-to-analog converter having a digital input D for receiving an input digital signal, a high-reference voltage input $E_o$ for receiving an analogue voltage, a low-reference voltage input $E_i$ for receiving an analogue voltage, and an analogue voltage output V, where $V = D (E_o - E_i) + E_i$;

b. a first, fixed voltage source operatively connected to said low reference voltage input;

c. a variable voltage source operatively connected to said high-reference voltage input; and d. means for connecting the input digital signal to said digital input.

11. The function generator recited in claim 10 wherein said variable voltage source comprises voltage-summing means having a fixed voltage source connected to a first input and a percentage of the voltage at said analogue voltage output connected to a second input.

12. A hybrid digital-to-analog function generator for generating an analogue voltage which is a nonlinear function of an input digital signal comprising:

a. first and second digital-to-analog converter each having a digital input D for receiving an input digital signal, a high-reference voltage input $E_o$ for receiving an analogue voltage, a low-reference voltage input $E_i$ for receiving an analogue voltage, and an analogue voltage output V, where $V = D (E_o - E_i) + E_i$;

b. first voltage-summing means having first and second inputs and an output operatively connected to said high-reference voltage input of said first digital-to-analog converter;

c. a first fixed voltage source operatively connected to said first input of said voltage-summing means;

d. a voltage divider operatively connected to said analogue voltage output of said second digital-to-analog converter, the output of said voltage divider being operatively connected to said second input of said voltage-summing means;

e. a second fixed voltage source operatively connected to said low-reference voltage input of said first digital-to-analog converter;

f. means for connecting said analogue voltage output of said first digital-to-analog to said high-reference voltage input of said second digital-to-analog converter; and g. means for connecting the input digital signal to said digital inputs of said first and second digital-to-analog converters.

13. The function generator recited in claim 12 further comprising:

a. second voltage-summing means having first and second inputs;

b. a third fixed voltage source connected to said first input of said second voltage-summing means; and, c. said analogue voltage output of said second digital-to-analog converter connected to said second input of said second voltage-summing means.

14. A method of generating an analogue voltage which is a nonlinear algebraic function of a digital number comprising the steps of:

a. generating a digital number;

b. feeding said digital number to first and second digital-to-analog converters each having a high-reference voltage input and a low reference voltage input;

c. supplying a first analogue voltage to said high-reference voltage input of said first digital-to-analog converter and a second analogue voltage to said low-reference voltage input of said first digital-to-analog converter, said first analogue voltage being greater than said second analogue voltage; and d. feeding the output of said first digital-to-analog converter to the high-reference voltage input of said second digital-to-analog converter whereby the output of said second digital-to-analog converter is the analogue voltage desired.

15. The method as recited in claim 14 comprising the additional step of adding a third analogue voltage to the output of said second digital-to-analog converter.

16. A method of generating an analogue voltage which is a nonlinear algebraic function of a digital number comprising the steps of:

a. generating a digital number;

b. feeding said digital number to a digital-to-analog converter having a high-reference voltage input and a low-reference voltage input;

c. supplying a fixed analogue voltage to said high-reference voltage input; and d. supplying a variable reference voltage to said low-reference voltage input whereby the output of said digital-to-analog converter is the analogue voltage desired.

17. The method recited in claim 16 wherein the step of supplying a variable reference voltage to said low-reference voltage input comprises feeding a percentage of the output of said digital-to-analog converter to said low-reference voltage input.

18. A method of generating an analogue voltage which is a nonlinear algebraic function of a digital number comprising the steps of:

a. generating a digital number;

b. feeding said digital number to a digital-to-analog converter having a high-reference voltage input and a low-reference voltage input;

c. supplying a fixed analogue voltage to said low-reference voltage input; and d. supplying a variable reference voltage to said high-reference voltage input whereby the output of said digital-to-analog converter is the analogue voltage desired.

19. The method recited in claim 18 wherein the step of supplying a variable reference voltage to said high-reference voltage input comprises feeding the sum of a second fixed reference voltage plus a percentage of the output of said digital-to-analog converter to said high-reference voltage input.

20. A measuring system for generating a digital number indicative of the characteristic being measured, comprising:

a. a sensor for generating an analogue voltage indication of the desired characteristic;

b. a comparator having first and second inputs, the output of said sensor being operatively connected to said first input of said sensor;

c. a count control circuit having an input operatively connected to the output of said comparator whereby said count control circuit assumes a first state when said first input of said comparator is greater than said second input and assumes a second state when said second input of said comparator is greater than said first input;

d. a reversible digital counter operatively connected to the output of said comparator; and e. a hybrid function generator operatively connected to the output of said counter, the output of said function generator being operatively connected to said second input of said comparator, said function generator comprising:

1. first and second digital-to-analog converters each having a digital input D for receiving an input digital signal, a high-reference voltage input $E_o$ for receiving an analogue voltage, a low-reference voltage input $E_i$ for receiving an analogue voltage, and an analogue voltage output V, where $V = D(E_o - E_i) + E_i$;

2. a first voltage source operatively connected to said high-reference voltage input of said first digital-to-analog converter;
3. a second voltage source operatively connected to said low-reference voltage input of said first digital-to-analog converter;
4. means for connecting said analogue voltage output of said first digital-to-analog converter to said high-reference voltage input of said second digital-to-analog converter; and 5. means for connecting the digital input signal to the digital input of said first and second digital-to-analog converter, the output of said second digital-to-analog converter being the analogue voltage output of said function generator.

21. The measuring system recited in claim 20 wherein said sensor comprises a radiation source and a radiation detector.

22. The measuring system recited in claim 21 wherein said radiation source comprises a light source and said radiation detector comprises a photocell.